G. A. FOWLER.
FLUID OPERATED ROTARY MOVEMENT REVERSING MECHANISM.
APPLICATION FILED MAY 22, 1909.
976,998.
Patented Nov. 29, 1910.
2 SHEETS—SHEET 1.
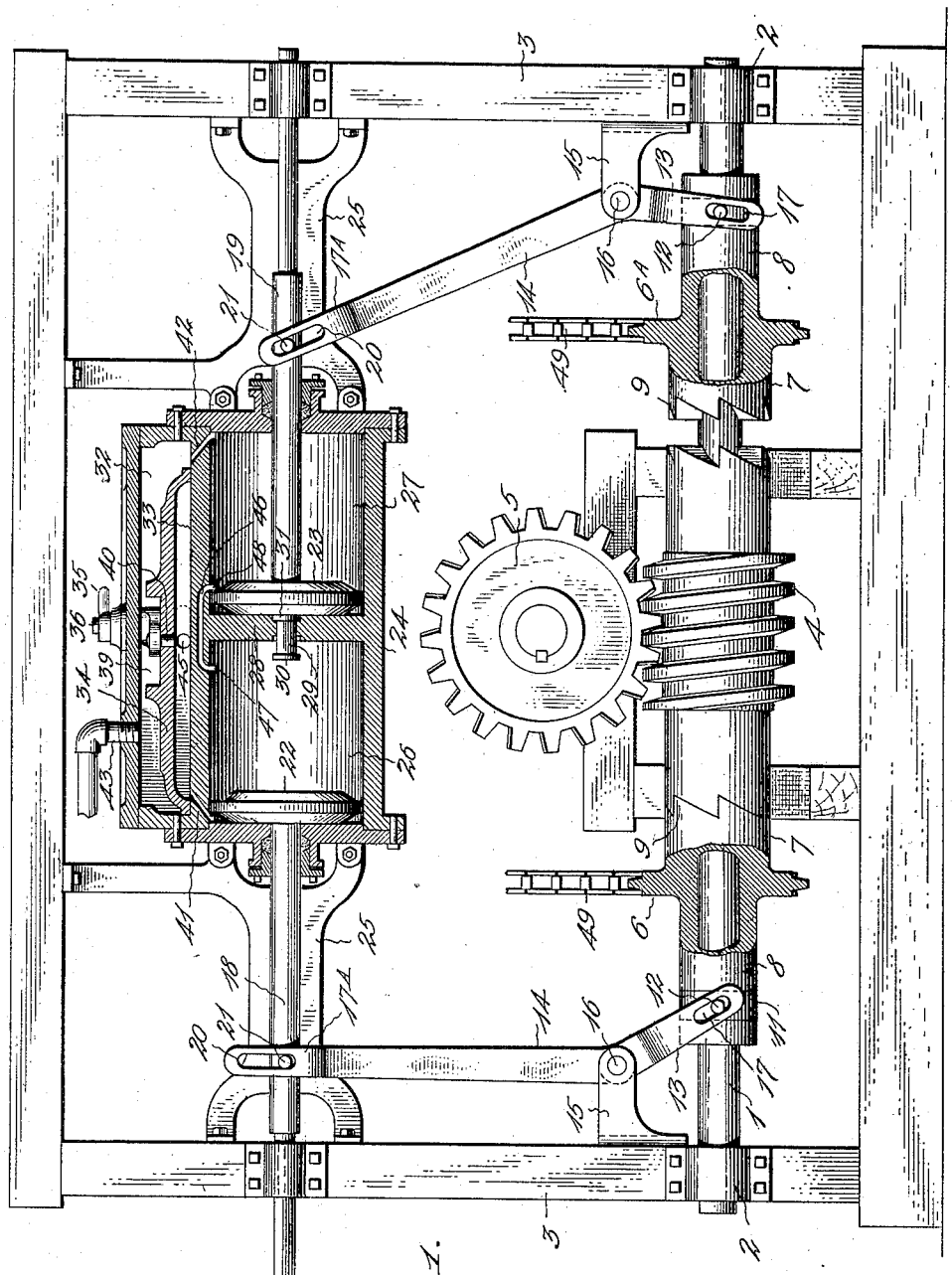

G. A. FOWLER.
FLUID OPERATED ROTARY MOVEMENT REVERSING MECHANISM.
APPLICATION FILED MAY 22, 1909.
976,998.
Patented Nov. 29, 1910.
2 SHEETS—SHEET 2.
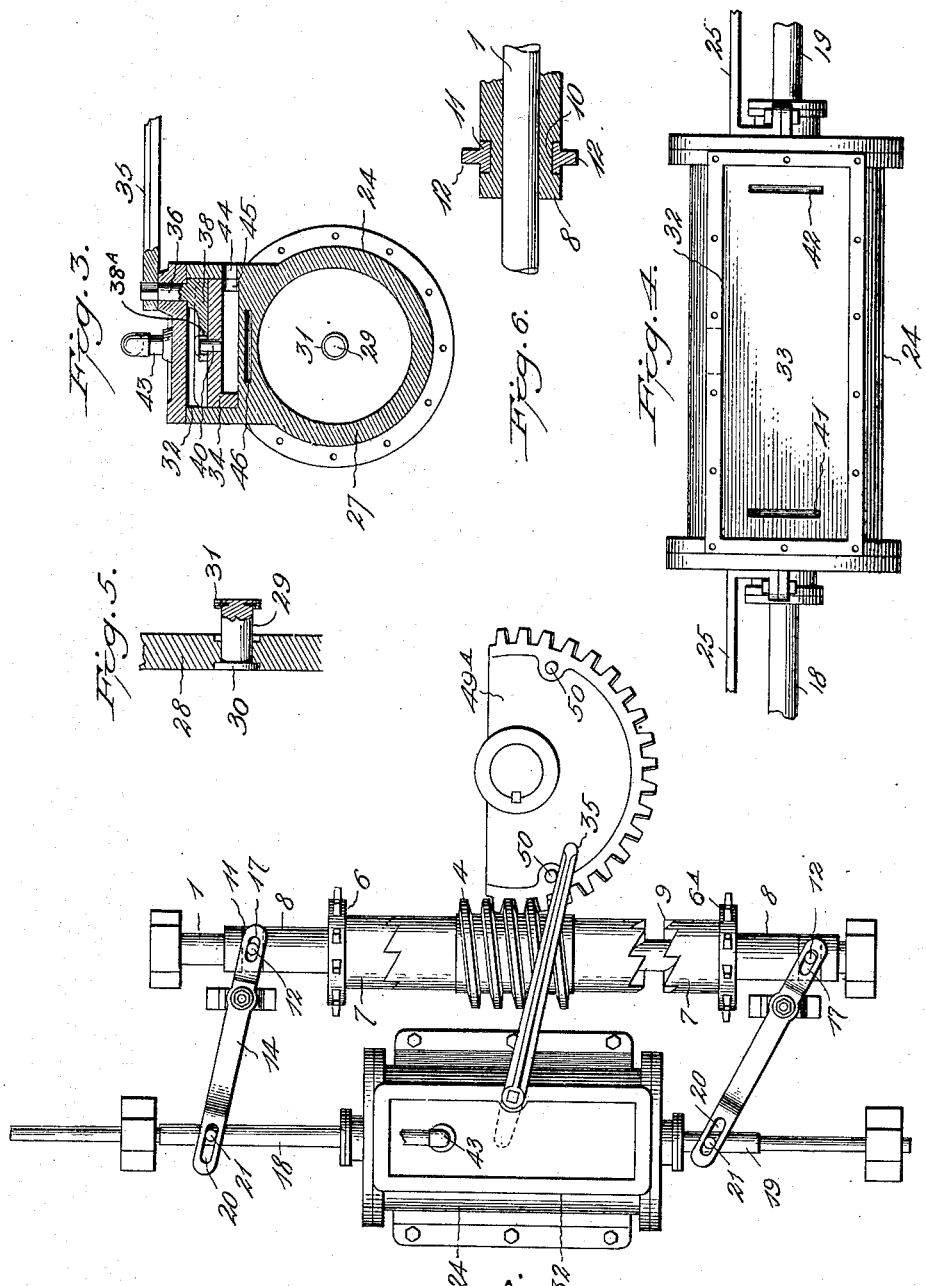

UNITED STATES PATENT OFFICE.

GEORGE A. FOWLER, OF DENVER, COLORADO.

FLUID-OPERATED ROTARY-MOVEMENT-REVERSING MECHANISM.

976,998.  Specification of Letters Patent.  Patented Nov. 29, 1910.

Application filed May 22, 1909. Serial No. 497,776.

*To all whom it may concern:*

Be it known that I, GEORGE A. FOWLER, a citizen of the United States of America, residing at the city and county of Denver and State of Colorado, have invented a new and useful Fluid-Operated Rotary-Movement-Reversing Mechanism, of which the following is a specification.

My invention relates to improvements in fluid operated rotary movement reversing mechanism; and the objects of my invention are: first, to provide a valve controlled compressed air or other actuating fluid operating cylinder and piston mechanism, that will operate oppositely rotating and opposing clutch-members to engage and rotate and reverse the rotary motion of a driving shaft at any desired predetermined time or automatically at predetermined intervals of time; second, to provide valve controlled fluid operating mechanism by which the rotary motion of driving shafts can be manually or automatically reversed in opposite directions; and third, to provide a simple, powerful and practical mechanism for reversing the rotary direction of driving shafts and of reciprocal and oscillating machinery. I attain these objects by the mechanism illustrated in the accompanying drawings, in which:

Figure 1, is a view partly in front elevation and partly in section, of the improved device. Fig. 2, is a plan view of a slightly different arrangement of the device, the valve shifting lever being arranged to be operated either manually or automatically. Fig. 3, is a transverse, vertical sectional view through one of the cylinders and the valve chest. Fig. 4, is a plan view of the cylinder, the cover for the valve chest and the slide valve being removed. Fig. 5, is a slightly enlarged sectional view of a portion of the partition between the cylinders, showing the sliding pin which is alternately operated by each piston, to move the opposite piston a suitable distance relatively to a fluid inlet port. And Fig. 6, is a sectional view through the hub portion of one of the clutch-members, showing one of the collars which are engaged by rock arms for shifting said clutch-members.

Similar letters of reference refer to similar parts throughout the several views.

Referring to the drawings, the numeral 1, designates a driving shaft, which is journaled at its opposite ends in boxes 2, that are supported on standards 3. This driving shaft is adapted to be driven and to transmit power alternately in opposite directions, either through a partial revolution in opposite directions, or during a predetermined period of time in either direction of its rotative movement; and it is further adapted to be either manually or automatically controlled and reversed in its rotative movement. This shaft 1, being a driving shaft, may be arranged to transmit its rotative movement from a pulley or sprocket wheel or through bevel or spur or worm gearing. I have preferably illustrated it adapted to transmit its rotative movement through the medium of the worm form of gearing, and have illustrated the central portion of the shaft provided with a worm 4, which may be made an integral part of the shaft, or may be made separate from it and be keyed or otherwise secured to it. This worm 4 is preferably as illustrated, in mesh with a worm gear 5, which is adapted to be driven by it. Rotative movement is imparted to the shaft through the medium of belt pulleys, gears, sprocket wheels, or any other power transmission devices. I preferably illustrate rotative movement transmitted to the shaft through the medium of a pair of sprocket wheels 6 and 6<sup>A</sup>. These sprocket wheels are slidably mounted on the shaft between its worm portion and its journal boxes, and each sprocket wheel is provided with hub portions 7 and 8, on each side of it. The hub portion 7 of each wheel, which faces the worm portion of the shaft, is provided with a clutch-member, which is formed on or attached to the end surface of each hub. I preferably illustrate the ends of these hubs provided with saw-tooth shaped clutch teeth 9, although square or other forms of clutch engaging surfaces, such as friction clutch surfaces, may be used if desired, and the opposite end portions of the central portion of the shaft, which is made of larger diameter than the shaft and is preferably made of the same diameter as the clutch hub-portions of the adjacent sprocket wheels, are provided with clutch-members, similar to those formed on the inner hubs 7 of the sprocket wheels. I illustrate saw-tooth clutch surfaces formed on the opposite end portions of the worm, arranged opposite to and to register with and lock to the saw-tooth clutch teeth of the hubs of the sprocket wheels.

The opposite hub portions 8 of the sprocket wheels, contain a neck portion 10, in which a collar 11, is rotatably mounted. This collar is provided with oppositely arranged trunnions 12, which are engaged by yoke levers 13, the center portions of which are provided with an extending arm portion 14, which extends from adjacent to the yoke portion at an angle toward the central portion of the driving shaft. Each of these yoke arms is pivotally connected to a lug 15, or other suitable bearing formed on the supporting standards 3 by pins 16. The ends of the yokes are provided with slots 17, into and through which the trunnions 12 extend. The terminal end portions of the arms 14 are also provided with yoke ends 17^A, which straddle piston rods 18 and 19, and these yoke ends are provided with slots 20, and the piston rods are provided with pins 21, which extend from the opposite sides of these piston rods into and through the slots of the ends of these yokes. These arms I term the clutch operating rock arms.

The piston rods are attached to and extend from piston heads 22 and 23, which are reciprocally mounted in a cylinder 24. This cylinder 24 is supported between the standards by any suitable means, preferably by suitable cross bars 25, that extend between the standards to which the cylinder is attached. This cylinder is provided with two cylindrical bores 26 and 27, in which the piston heads 22 and 23 are reciprocally mounted, and these cylinder bores are arranged in direct horizontal alinement, and are separated from each other by a partition 28. A circular aperture is formed at the axial center of this partition, in which a pin 29 is slidably mounted, and this pin is held in its aperture against displacement therefrom by an integral head 30, at one end, and a removable head 31 at its opposite end, which is secured to the pin by screws, as shown in Fig. 5, or in any other suitable manner. These heads fit alternately in corresponding recesses in the partition, so that at such times they will be flush with the face of the partition. This pin is made enough longer than the thickness of the partition to permit it to be moved by the piston heads in alternate order far enough to move the opposite piston a sufficient distance to uncover its actuating fluid inlet port, as will be hereinafter described.

The cylinder is provided with a valve chest 32, which is provided with a valve seat 33, and a flat slide valve 34 is reciprocally seated on the valve seat within the valve chest. This valve is moved by a lever 35, which is mounted on the squared end of a pin 36, that is pivotally journaled in the top of the valve chest. A crank arm 38 is formed integral with the lower end of the pin 36, the opposite end of the crank-arm extending into a recess 39, formed in the top of the valve, and being pivotally secured to the valve by a pin 40. A slot 38^A is provided in the crank-arm 38, to allow the reciprocal movement of the end of the crank-arm that is mounted on the pin 40, to operatively move the valve throughout the length of its stroke in a straight line in the valve chest, which reciprocal stroke of the valve and crank-arm need not necessarily exceed half an inch. The lever 35 extends from the pin 36 far enough to be moved by the hand of an operator, or to be engaged by projecting pins on the worm gear or other power transmitting wheel, that is operated by reverse movements of the driving shaft.

The valve is enough shorter than the length of the inside of the valve chest to control by its operative strokes two ports 41 and 42, which are formed at opposite ends of the valve chest, through the valve seat shell portion of the cylinder, and admit the actuating fluid from the valve chest into the outer ends of the two piston bores of the cylinder.

An actuating fluid inlet pipe 43 is threaded to the valve chest, and an exhaust aperture 44 is also formed in the valve chest, which registers with an exhaust port 45, formed in the side of the valve. This exhaust port of the valve connects alternately with the ports 41 and 42 of the valve chest, at the ends of its opposite reciprocal movements. The two piston bores of the cylinder are connected on opposite sides of their dividing partition 28 by a port 46, which extends from each bore through the valve seat shell portion of the cylinder over the partition.

The entrances 47 and 48 of this port in the cylinders 26 and 27 respectively, are positioned at a distance from the opposite sides of the partition sufficient to enable the piston heads, which are preferably disk-shaped heads, to stand wholly within that part of each cylinder between the entrances to this port and the partition when the piston heads are against or almost against the partition, and the object of this port is to allow the actuating fluid to pass from one cylinder to the other, and move the pistons on their outward strokes, as will be presently explained, and in order to facilitate this outward movement adjacent to the partition, the peripheral edge portion of each piston is beveled on both sides to allow the actuating fluid to flow readily behind their sides when at the opposite ends of their strokes.

Sprocket chains 49 extend from the sprocket wheels to two independent sources of power, which are adapted to rotate the sprocket wheels in opposite directions. I do not illustrate these power connections, as they do not form any part of my present invention.

While the valve operating lever 35, is adapted to be operated by the hand of an operator to reverse the position of the valve in the valve chest, it may also be moved automatically by pins 50, secured to the worm gear or to a segment 49ᴀ, as shown in Fig. 2, which can be arranged to reverse the valve and consequently the direction of movement of the driving shaft, and of the driven gear at each half revolution, or by using one lever engaging pin the lever may be operated to move the valve at each complete revolution. I preferably use compressed air as an actuating fluid for driving the pistons, but steam may be used if desired.

The operation of my valve controlled reversing mechanism is as follows: The sprocket chains and their wheels are rotated in opposite directions from a source of power, and a supply of compressed air is conveyed through the air inlet pipe to the valve chest when the operator grasps the valve operating lever and moves the valve to one end of the valve chest, and assuming that the valve has been moved to uncover the port 42, the compressed air enters the cylinder 27 and moves the piston head 23 against the partition, and as it moves to the rear end of its cylinder, its piston rod through the medium of the pins 21 shifts its clutch operating lever 14 with it, which causes this lever to move the sprocket wheel 6ᴀ along the driving shaft away from the clutch-member of the adjacent end of the worm, and consequently to uncouple it from the adjacent end of the worm, and when the piston approaches the rear end of the cylinder, it strikes the pin 29 and moves it through the partition 28, and the pin moves the piston 22 away from the partition, as the piston 23 moves against it. When the piston 23 engages the partition, it uncovers the end 48 of the port 46, and the piston 22 is pushed beyond the end 47 of the said port, which allows the compressed air to flow through this port from the cylinder 27 into the cylinder 26 and behind the piston 22, which has been moved away from the partition by the pin far enough to uncover this port to admit air behind it. The air then moves the piston 22 to the front of its cylinder 26, and in doing so its piston moves its clutch lever 14 to move its sprocket wheel clutch-member 7 into engagement with the adjacent clutch-member on the end of the worm, and as this sprocket wheel 6 is rotating in an opposite direction from the sprocket wheel 6ᴀ, the direction of rotary motion that was imparted to the worm by the sprocket wheel 6ᴀ is reversed, and the direction of rotary motion of the driven gear is also reversed.

The operator can allow the motion of the worm to continue in either direction as long as he desires, and when he desires to again reverse it, he grasps the valve operating lever and swings it to cause the crank arm to move the valve to close the port 42 and to open the port 41. The air then flows behind the piston 22 and moves it to the rear of its cylinder 26, where it engages and moves the pin 29, which moves the piston 23 beyond the entrance 48 of the port 46; the piston 22 at the same time uncovers the end 47 of the port 46, which permits the air to pass through port 46 and behind the piston 23 and moves it to the front end of its cylinder, and in doing so its piston rod moves its clutch lever to throw its sprocket wheel clutch-member again in mesh with the adjacent clutch-member of the worm, again reversing the direction of movement of the pinion and of the driven gear.

If desired to move the valve automatically, the pins 50 are arranged to engage the end of the lever 35, which is secured to the pivoted valve operating crank 38, and move the valve to uncover the ports in alternate order at each substantially half revolution of the driven gear, and if one pin were used on the driven gear, the wheel would reverse its own motion at each complete revolution, by the contact of said pin, alternately, with the opposite sides of the lever 35.

My invention is particularly adapted to effect a reverse rotary movement of any desired predetermined duration of time, or a partial reciprocal rotative swinging or oscillating movement of a portion of the gear, and is especially adapted to the swinging reciprocal movement of the drilling head of such a tunneling machine as is illustrated in my Patent No. 891473, dated twenty-third day of June, 1908, when used with a segment of a gear instead of a full gear, as illustrated.

Having described my invention, what I claim as new and desire to secure by Letters Patent, is:

1. A reversing mechanism comprising a reversibly rotatable driving shaft; oppositely rotated clutch-bearing members adapted to alternately engage said driving shaft; and automatically - controlled fluid - operated means for effecting said alternate engagement.

2. A reversing machanism comprising a reversibly rotatable driving shaft; oppositely rotated clutch-bearing members adapted to alternately engage said driving shaft; a cylinder in proximity to said driving shaft; fluid-operated pistons in said cylinder; and operating connections between said pistons and said rotated clutch-bearing members.

3. A reversing mechanism comprising a reversibly rotatable driving shaft; oppositely rotated clutch-bearing members adapted to alternately engage said driving shaft; a multi-chamber cylinder in proximity to said driving shaft; fluid inlet and outlet ports in each chamber; a valve for controlling the inflow and discharge of the fluid to and from the chambers; a reciprocating piston in each chamber; and operating connections between the pistons and said rotated clutch-bearing members.

4. A reversing mechanism comprising a reversibly rotatable driving shaft; oppositely rotated clutch-bearing members adapted to alternately engage said driving shaft; a multi-chamber cylinder in proximity to said driving shaft; a fluid-operated piston in each chamber; a fluid passage connecting the chambers; fluid inlet and exhaust passages in the chambers; a valve for controlling the inflow and discharge of fluid to and from the chambers, and so arranged that when in one position the pistons are moved successively to one end of the chambers, and when in the other position the pistons are moved successively to the opposite end of the chambers; and operating connections between the pistons and said rotated clutch-bearing members.

5. A reversing mechanism comprising a reversibly rotatable driving shaft; oppositely rotated clutch-bearing members adapted to alternately engage said driving shaft; a multi-chamber cylinder in proximity to said driving shaft; a fluid-operated reversible piston in each chamber; and means including a pivoted rock arm and a pin-bearing collar loosely mounted on the driving shaft, adjacent to said rotated clutch-bearing members, for operatively connecting the pistons and said rotated clutch-bearing members, to move the latter into operative engagement with the driving shaft.

6. In a reversing mechanism, a two-chamber cylinder; fluid-operated successively-moved pistons in the chambers; a fluid-passage between adjacent sides of the chambers; a sliding-pin between the chambers, and adapted to be engaged by the pistons in alternate order to move the non-operated piston into operative relation to said fluid-passage; fluid-supply ports in said chambers; an exhaust port for the fluid; and a valve arranged to control the passage of the fluid, to operate the pistons as desired.

7. In a reversing mechanism, a cylinder having a central partition; fluid-operated successively-moved pistons adapted to reciprocate in each of the chambers formed by said central partition; a fluid-passage between the adjacent ends of the chambers; fluid-supply ports at opposite ends of the chambers; a sliding-pin mounted in said partition, between the chambers, and adapted to be engaged by the pistons in alternate order, to move the non-operated piston into operative relation to said fluid-passage; an exhaust port for the fluid; a sliding-valve for controlling the inflow and discharge of fluid to and from the chambers, and so arranged that when in one position the pistons are moved successively to one end of the chambers, and when in another position the pistons are moved successively to the other end of the chambers; and means for operating said valve as desired.

8. A reversing mechanism comprising a driving shaft having an enlarged portion provided centrally with a worm, and at its ends with clutch-members; a shaft provided with a pinion meshing with said worm, and adapted to be reversibly rotated by said driving shaft; clutch-bearing members loosely mounted on the smaller extended portions of the driving shaft, one on each side of the worm-bearing enlarged portion; means for rotating the loosely-mounted clutch-bearing members in opposite directions; and means for effecting alternate engagement, as desired, between the oppositely-driven clutch-bearing members, and the clutch-members of the worm-bearing portion of the driving shaft.

9. A reversing mechanism comprising a reversibly rotatable driving shaft having an enlarged portion provided centrally with a worm and at its ends with clutch-members; oppositely rotated clutch-bearing members loosely mounted on the smaller extended portions of the driving shaft, one on each side of the worm-bearing enlarged portion; pin-bearing collars loosely mounted upon the smaller extended portions, adjacent to said oppositely rotated clutch-bearing members; supporting standards in which said driving shaft is journaled; a cylinder in proximity to said driving shaft; fluid-operated reciprocating pistons in the cylinder, said pistons having pin-bearing shafts; rock-shafts pivoted in brackets secured to the supporting standards, and provided with yoked portions having slots therein adapted to engage said pins, to move alternately the pin-bearing collars and hence the oppositely rotated clutch-bearing members into engagement with the clutch-members of the enlarged portions of the driving shaft, upon alternate reciprocation of said pistons.

10. A reversing mechanism comprising a reversibly rotatable driving shaft; oppositely rotated clutch-bearing members adapted to alternately engage said driving shaft; sliding pin-bearing members, adapted, when moved, to effect engagement between said rotatable driving shaft and said oppositely rotated clutch-bearing members; a cylinder in proximity to said driving shaft; reciprocating pistons in the cylinder, said pistons having oppositely-disposed pin-bearing shafts; means for controlling the reciprocation of the pistons; and means including yoke-bearing rock-shafts for operatively connecting the shafts of said reciprocating pistons and said sliding pin-bearing members, to move the latter to effect the aforesaid engagement between said rotatable driving shaft and said oppositely rotated clutch-bearing members.

11. In a reversing mechanism, a reversibly rotatable driving shaft; oppositely rotated members adapted to alternately engage said driving shaft; a cylinder in proximity to said driving shaft; a central partition in said cylinder; fluid-operated successively-moved pistons adapted to reciprocate in each of the chambers formed by said partition; a fluid-passage between the adjacent ends of the chambers; a sliding-pin mounted in said partition, between the chambers, and adapted to be engaged by the pistons in alternate order, to move the non-operated piston into operative relation to said fluid-passage; fluid-supply ports in each chamber; an exhaust port for the fluid; a sliding-valve arranged to uncover the fluid-supply ports of each chamber alternately, whereby the corresponding piston is operated; and operating connections between the pistons and said oppositely rotated members.

12. In a reversing mechanism, a cylinder having a central partition; fluid-operated successively-moved pistons adapted to reciprocate in each of the chambers formed by said central partition; a fluid-passage between the adjacent ends of the chambers, with outlet openings at a distance from said central partition somewhat greater than the thickness of the piston-heads; a sliding-pin mounted in said partition, between the chambers, and adapted to be engaged by the pistons in alternate order, to move the non-operated piston into operative relation to said fluid-passage; a valve-chest on said cylinder; fluid-inlet and exhaust-outlet apertures leading into and out of said valve-chest, and from said valve-chest into the opposite end portions of the chambers; a sliding-valve in said valve-chest, for controlling the inflow and discharge of fluid to and from the chambers, and so arranged that when in one position the pistons are moved successively to one end of the chambers, and when in another position the pistons are moved successively to the other end of the chambers; a crank-arm pivotally connected at one end to said valve, said crank-arm being provided at its opposite end with a stem projecting through the casing of said valve-chest; and means connected with said stem for moving the crank-arm, and thereby moving the sliding-valve to either of the aforesaid positions.

13. A reversing mechanism comprising a driving shaft having an enlarged portion provided centrally with a worm, and at its ends with clutch-members; a shaft provided with a pinion meshing with said worm, and adapted to be reversibly rotated by said driving shaft, said pinion bearing projecting portions rotating therewith; oppositely rotated clutch-bearing members adapted to alternately engage the clutch-members of the worm-bearing portion of the driving shaft; valve-controlled fluid-operated means for effecting said alternate engagement; and means including the rotating projecting portions on said pinion for automatically operating the controlling valve of said fluid-operated means.

In testimony whereof I affix my signature in presence of two witnesses.

GEORGE A. FOWLER.

Witnesses:
   G. SARGENT ELLIOTT,
   ADELLA M. FOWLE.